(12) United States Patent
Takaba et al.

(10) Patent No.: US 6,946,633 B2
(45) Date of Patent: Sep. 20, 2005

(54) OPTICAL DISC APPARATUS AND METHOD FOR CONTROLLING FOCUS OF THE SAME

(75) Inventors: Sadayuki Takaba, Osaka (JP); Minoru Hirashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 316 days.

(21) Appl. No.: 10/370,600

(22) Filed: Feb. 24, 2003

(65) Prior Publication Data

US 2003/0222195 A1 Dec. 4, 2003

(30) Foreign Application Priority Data

Feb. 25, 2002 (JP) .................................... P2002-047317

(51) Int. Cl.$^7$ ................................................ G11B 7/11
(52) U.S. Cl. ................................. 250/201.5; 369/44.25
(58) Field of Search .................... 250/201.5; 369/44.25, 369/44.26, 44.41

(56) References Cited

U.S. PATENT DOCUMENTS 5,793,720 A * 8/1998 Nishikata ................. 369/44.25
6,295,256 B1 * 9/2001 Kimikawa et al. ....... 369/44.32
6,760,285 B2 * 7/2004 Hirashima et al. ....... 369/44.25

FOREIGN PATENT DOCUMENTS

| JP | 08-212567 | 8/1996 |
|---|---|---|
| JP | 2000-276743 | 10/2000 |
| JP | 2000-339704 | 12/2000 |
| JP | 2001-222826 | 8/2001 |

* cited by examiner

Primary Examiner—Stephone B. Allen
(74) Attorney, Agent, or Firm—Morgan, Lewis & Bockius LLP

(57) ABSTRACT

A focus error signal which is a differential signal indicative of a difference between a sum of amounts of reflected light detected by photodetector elements A and C of a four-split photodetector, and that of amounts of reflected light detected by photodetector elements B and D is measured. The level of the focus error signal at a timing when the amount of reflected light from the optical disc and detected by the four-split photodetector is at the maximum is set as a reference level. The gains of amplifiers 23 and 24 are individually adjusted so that the maximum and minimum values of the focus error signal are substantially symmetrical about the reference level. According to the configuration, the focus control can be performed by using the balance-adjusted focus error signal, and therefore can be stably conducted.

8 Claims, 6 Drawing Sheets

OPTICAL DISC APPARATUS AND METHOD FOR CONTROLLING FOCUS OF THE SAME

BACKGROUND OF THE INVENTION

The present invention relates to an optical disc apparatus which reads data recorded on an optical disc such as a CD or a DVD, and which outputs a reproduced signal based on the read data, and a method for controlling focus thereof.

In an optical disc apparatus which reads data recorded on an optical disc such as a CD or a DVD, and which outputs a reproduced signal (an audio signal and a video signal), conventionally, a focus control is performed to control the focus of a laser beam irradiating the optical disc.

In a usual optical disc apparatus, a four-split photodetector in which two photodetector elements are arranged in each of the vertical and lateral directions is disposed on a pickup head, and the focus control is performed by using a differential signal (hereinafter, referred to as focus error signal) indicative of a difference between a sum of amounts of reflected light detected by two of upper right and lower left ones of the photodetector elements, and that of amounts of reflected light detected by two of upper left and lower right ones of the photodetector elements. As well known in the art, the focus error signal is a signal which has an S shape characteristic shown in FIG. 7A with respect to deviation in focus on an optical disc. In the figure, the abscissa shows the displacement distance of an objective lens, and the lens is closer to an optical disc as further moving toward the right side.

In a process of reading data from an optical disc, a higher reading accuracy is attained as RF is larger. Therefore, a focus control in a usual optical disc apparatus is performed in the following manner.

In a focus control, a point which is between the points A and B shown in FIG. 7A, and at which the amount of reflected light (RF which is a sum of outputs of the four photodetector elements) reflected from the optical disc and detected by the photodetector is at the maximum is set as a reference point (Vref). The objective lens is displaced so that the level of the detected focus error signal coincides with the reference point. FIG. 8 is a view illustrating a displacement of an amount of light reflected from a disc. In FIG. 8, an abscissa axis indicates a displacement distance of an object lens as in FIG. 7, and an ordinate axis indicates a sum signal of outputs from the four-split photodetector elements.

Ideally, the reference point should be the center O between the points A and B in the focus error signal (the state of FIG. 7A is an ideal one). Actually, however, the reference point is deviated from the center O because of accuracies of optical components and the like constituting the pickup head (see FIGS. 7B and 7C), and hence the focus error signal is not well balanced. When a focus control is performed by using the focus error signal shown in FIG. 7B or 7C, an out-of-focus condition is easily produced (a state where the objective lens is moved to a position where the focus error signal cannot be obtained easily arises), thereby causing a problem in that the focus control is unstable. Namely, if a focus error signal of which output characteristics is shown in FIGS. 7B and 7C is used as it is to start a focus control operation, there are problems that firstly failure of focus-on is easily produced, and that secondly an out-of-focus condition is easily produced. Further, when such an out-of-focus condition is produced during a process of reading data from an optical disc, the objective lens is often largely displaced. This causes another problem in that, depending on the displacement direction of the objective lens, the objective lens collides with the optical disc to be broken.

The Unexamined Japanese Patent Application Publication No.2000-339704 proposes a technique in which, when an out-of-focus condition is produced, a bias is applied so that an objective lens is displaced in a direction opposite to an optical disc, and deviation from the balance of a focus error signal due to the application of the bias is adjusted. However, the publication teaches nothing about a technique of adjusting deviation from balance due to accuracies of optical components and the like constituting a pickup head.

SUMMARY OF THE INVENTION

It is an object of the invention to provide an optical disc apparatus in which balance of a focus error signal used in a focus control is adjusted, so that the focus control can be stably performed.

In other words, according to the invention, a characteristics of a pick-up head section is adjusted before starting an actual focus control operation, the characteristics thereof is adjusted during the actual focus control operation so that it is possible to obtain an ideal focus error signal output shown in FIG. 7A, whereby the above problems (failure of focus-on is easily produced, or out-of focus is easily produced even if focus on) are solved.

In order to attain the object, the optical disc apparatus of the invention has the following configuration.

(1) In an optical disc apparatus comprising:

a pickup head which has a four-split photodetector, two photodetector elements being arranged in each of vertical and lateral directions, and in which reflected light of an optical beam irradiating an optical disc that is set to a main unit is detected by the four-split photodetector, thereby reading data recorded on the optical disc;

a focus control section which controls an objective lens disposed in the pickup head to be moved, in an optical axis direction of the optical beam irradiating the optical disc, to maximize an amount of reflected light from the optical disc and detected by the four-split photodetector; and a reproduction section which outputs a reproduced signal based on the data that are read from the optical disc by the pickup head, the focus control section controls the objective lens to be moved in the optical axis direction, and measures, as a focus error signal, a differential signal indicative of a difference between a sum of amounts of reflected light detected by two of upper right and lower left ones of the photodetector elements, and a sum of amounts of reflected light detected by two of upper left and lower right ones of the photodetector elements, a level of the measured focus error signal at a timing when the amount of reflected light from the optical disc and detected by the four-split photodetector is at a maximum is set as a reference level, a first gain for the sum of amounts of reflected light detected by the two of upper right and lower left photodetector elements, and a second gain for the sum of amounts of reflected light detected by the two of upper left and lower right photodetector elements are adjusted, whereby a balance of the focus error signal is adjusted to cause maximum and minimum values of the focus error signal with respect to the reference level to be substantially symmetrical about the reference level, and the movement of the objective lens is controlled by using the balance-adjusted focus error signal.

(2) In the balance adjustment, the first and second gains are adjusted to cause the reference level to be substantially in a center between the maximum and minimum values of the focus error signal.

(3) The first and second gains are adjusted under a focus off state in which the movement of the objective lens is restricted.

According to the configuration, the objective lens is moved in the optical axis direction, and a differential signal indicative of a difference between a sum of amounts of reflected light detected by the two of upper right and lower left ones of the photodetector elements, and that of amounts of reflected light detected by the two of upper left and lower right ones of the photodetector elements, i.e., the focus error signal is measured. Next, the level of the measured focus error signal at a timing when the amount of reflected light detected by the four-split photodetector is at the maximum is set as the reference level. The first and second gains are individually adjusted so that the maximum and minimum values of the focus error signal are substantially symmetrical about the reference level, or the reference level is substantially in the center between the maximum and minimum values of the focus error signal. As a result, a balance-adjusted focus error signal can be obtained. Therefore, the focus control can be stably performed.

The first and second gains are adjusted under a focus off state in which the focus control is not performed. During a process of adjusting the gain, therefore, a phenomenon that the apparatus is temporarily operated at an inadequate gain to displace the objective lens does not occur. As a result, the objective lens can be prevented from colliding with the optical disc during the gain adjusting process (the process of adjusting the balance of the focus error signal) to be broken.

DETAILED DESCRIPTION OF THE PREFERRED EMBODIMENTS

Hereinafter, an optical disc apparatus which is an embodiment of the invention will be described.

Figure 1:
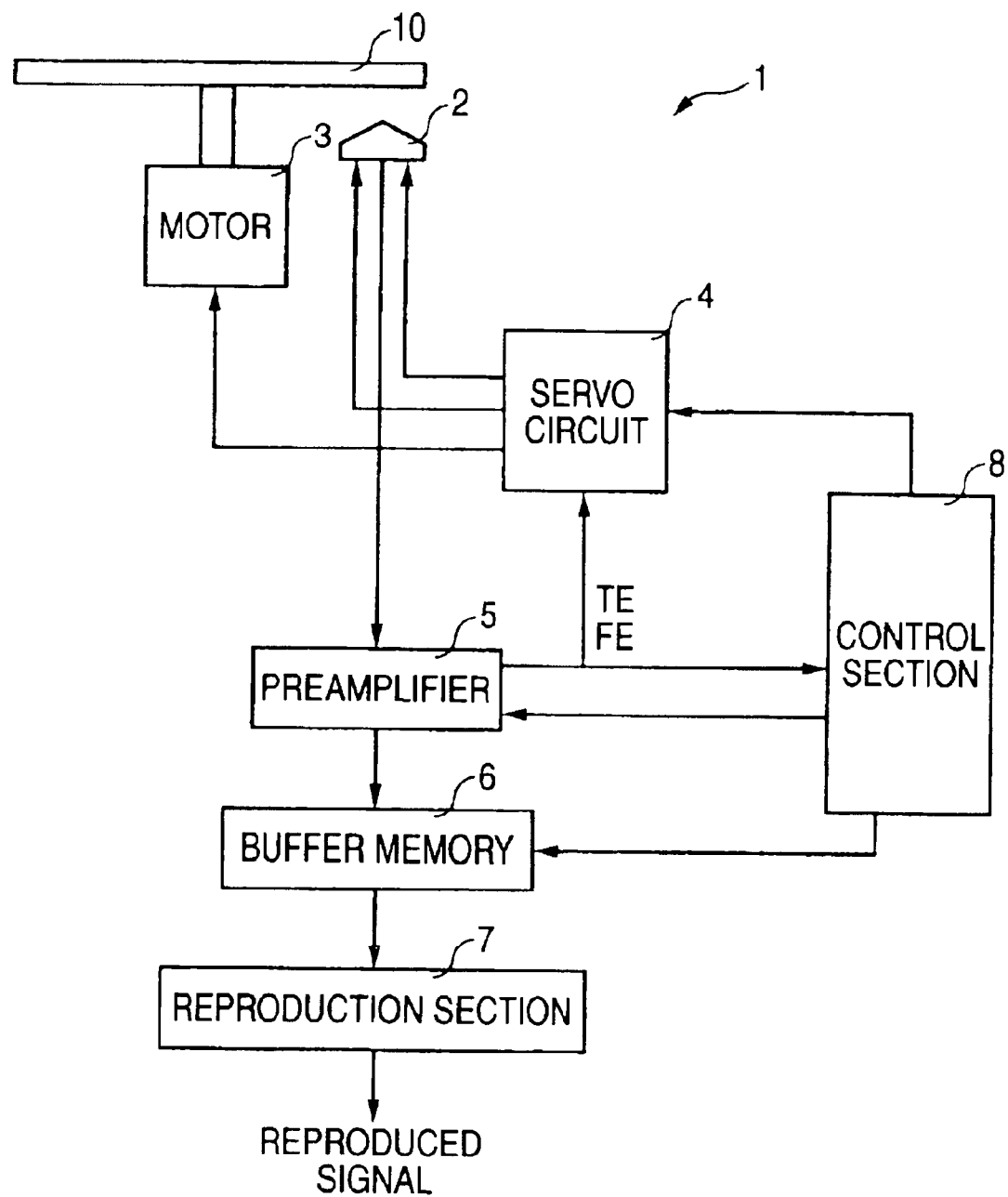
FIG. 1 is a diagram showing the configuration of an optical disc apparatus of an embodiment of the invention.

FIG. 1 is a block diagram showing the configuration of an optical disc apparatus which is an embodiment of the invention. The optical disc apparatus 1 of the embodiment comprises: a pickup head 2 which reads data recorded on an optical disc (a CD, a DVD, and the like) 10; a motor 3 which rotates the optical disc 10 set to a main unit; and a servo circuit 4 which controls the position of the pickup head 2 with respect to the optical disc 10, and the rotational speed of the optical disc 10 rotated by the motor 3.

The servo circuit 4 performs a tracking control of controlling movement of the pickup head 2 in a radial direction of the optical disc 10 (a horizontal direction), and a focus control of controlling movement of the pickup head in the direction of the axis of rotation of the optical disc 10 (a vertical direction).

An output of the pickup head 2 is supplied to a preamplifier 5. The preamplifier 5 supplies a tracking error signal (TE) and a focus error signal (FE) which are received from the pickup head 2, to the servo circuit 4. As well know in the art, the tracking error signal indicates the amount of deviation of the irradiating position of a light beam emitted from the pickup head 2 from the center of a track of the optical disc 10. The focus error signal indicates the amount of deviation of the focal position of the light beam emitted from the pickup head 2 from the data recording surface of the optical disc 10. The preamplifier 5 records the data read from the optical disc 10 into a buffer memory 6. A reproduction section 7 reads the data stored in the buffer memory 6, and outputs a reproduced signal (an audio signal and a video signal) based on the read data. A control section 8 controls the operation of the main unit.

Figure 2:
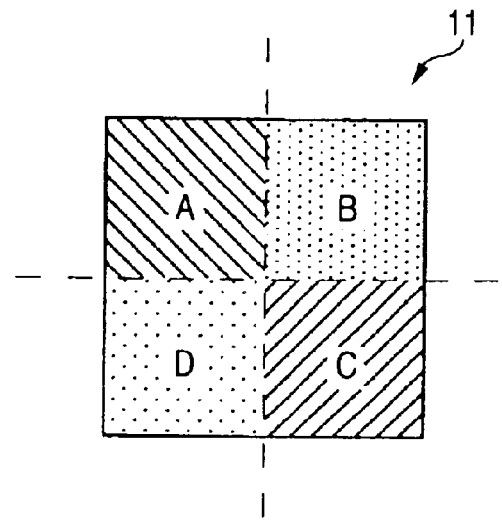
FIG. 2 is a view showing a four-split photodetector disposed in a pickup head.
Figure 3:
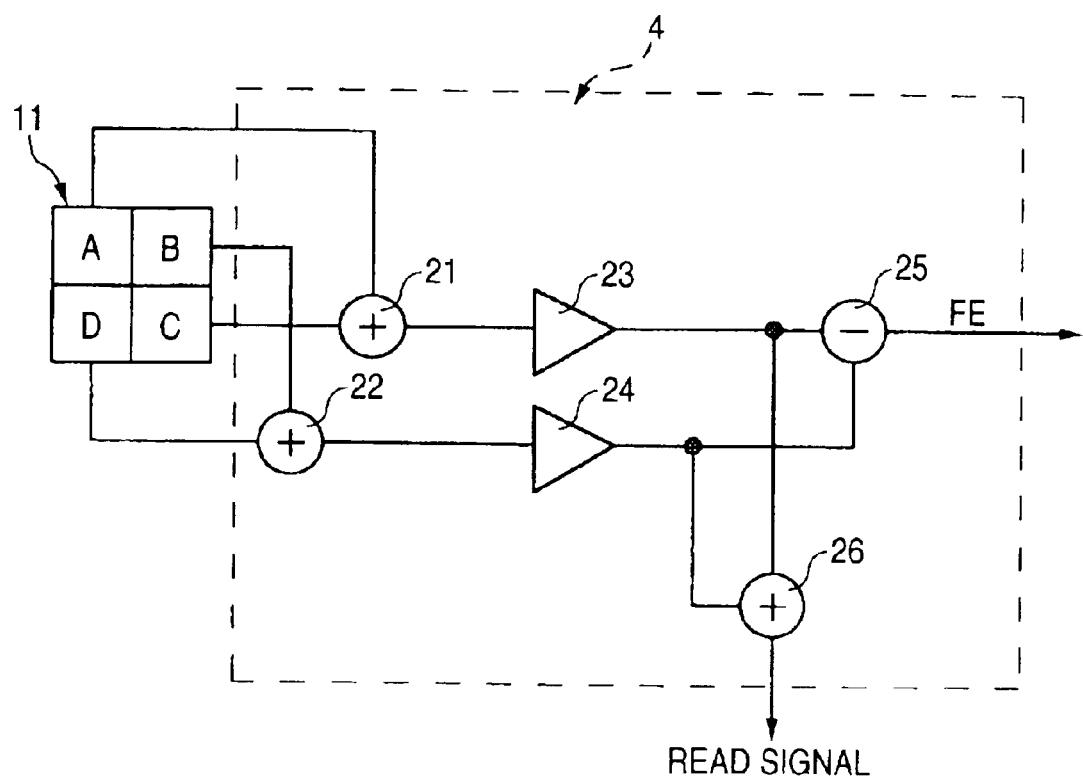
FIG. 3 is a diagram showing the configuration of a preamplifier of the optical disc apparatus of the embodiment of the invention.

In the pickup head 2, a four-split photodetector 11 is disposed in which four photodetector elements A to D are arranged in a form where two elements are arranged in each of vertical and lateral directions (see FIG. 2). Outputs of the photodetector elements A to D are supplied to the preamplifier 5. As shown in FIG. 3, the preamplifier 5 comprises: an adder 21 which adds the outputs of the photodetector elements A and C; an adder 22 which adds the outputs of the photodetector elements B and D; an amplifier 23 which amplifies an output of the adder 21; an amplifier 24 which amplifies an output of the adder 22; a subtractor 25 which outputs the focus error signal (FE) that is a difference between outputs of the amplifiers 23 and 24; and an adder 26 which adds the outputs of the amplifiers 23 and 24 to output a read signal. The gains of the amplifiers 23 and 24 are individually adjusted by the control section 8. Although not shown in FIG. 3, a bias application circuit which applies a bias to the focus error signal is disposed in order to adjust the offset of the focus error signal. The focus error signal to which a bias has been applied by the bias application circuit is supplied to the servo circuit 4.

Although not shown in FIG. 3, also a circuit which processes a signal supplied from the pickup head 2 to produce the tracking error signal that is to be supplied to the servo circuit 4 is disposed in the preamplifier 5. This circuit may be a circuit which produces a differential signal of a pair of side spot detectors (not shown) disposed in the pickup head, as the tracking error signal, or a circuit which processes the outputs of the photodetector elements A to D to produce the tracking error signal. These circuits are well known, and hence their description is omitted.

Hereinafter, the operation of the optical disc apparatus 1 of the embodiment of the invention will be described.

In the optical disc apparatus 1 of the embodiment, at a timing such as that when the optical disc 10 is set into the main unit, or that when a command to reproduce the optical disc 10 set to the main unit is input, a balance adjusting process of measuring the focus error signal and adjusting the balance of the focus error signal is performed.

Figure 4:
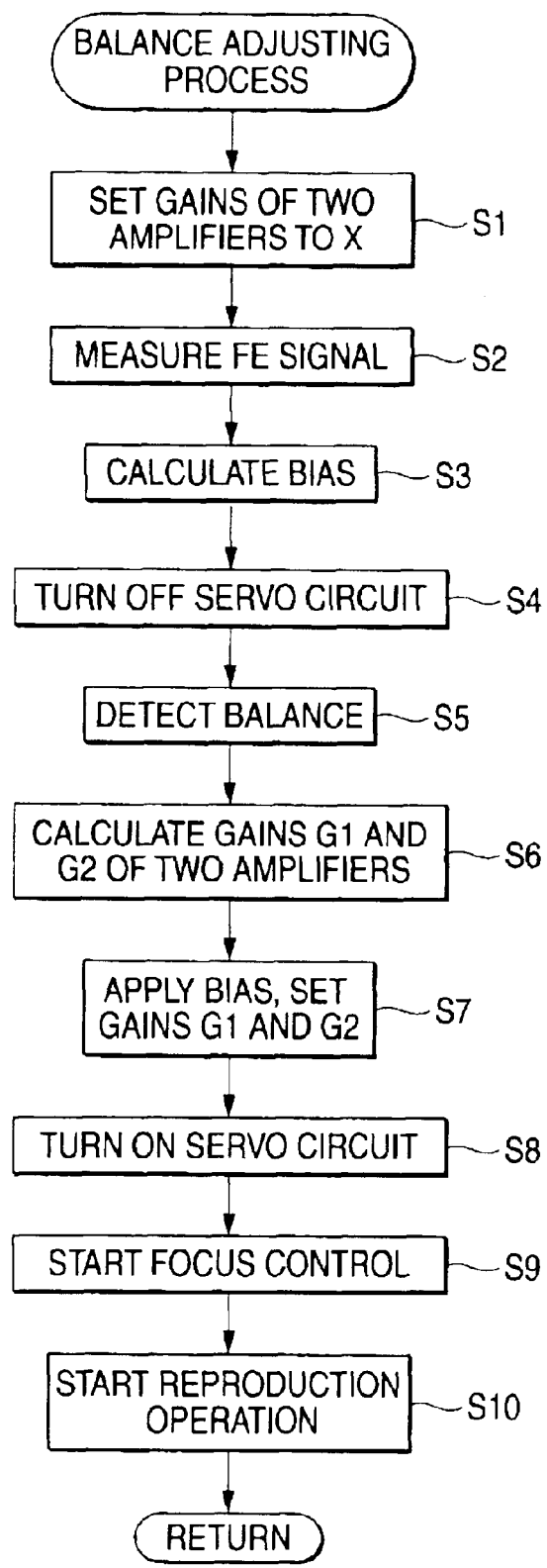
FIG. 4 is a flowchart showing the operation of the optical disc apparatus of the embodiment of the invention.

FIG. 4 is a flowchart showing the balance adjusting process. In the optical disc apparatus 1, the gains of the amplifiers 23 and 24 are set to a preset level X (s1), and the focus error signal is measured (s2). The step S2 is a process of, while approaching the objective lens of the pickup head 2 to the optical disc 10, measuring the waveform of the focus error signal output from the subtractor 25.

Figure 5A:
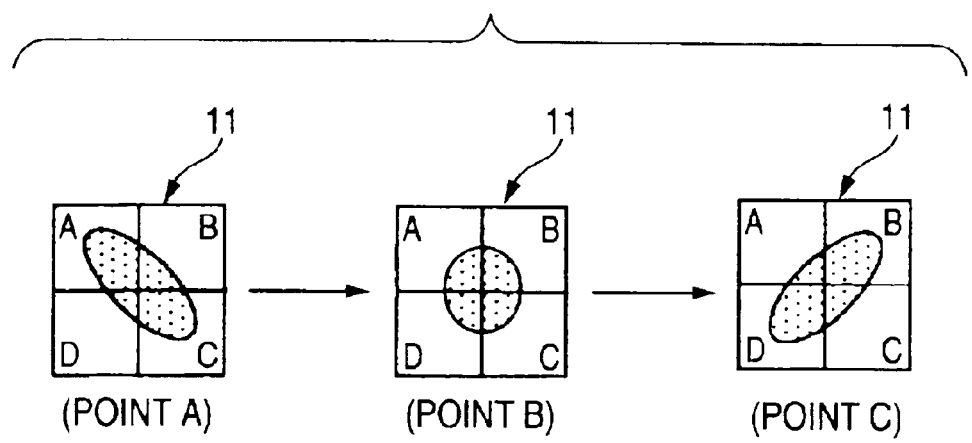
FIG. 5 is a view illustrating a focus error signal which is measured in a process of measuring the focus error signal.
Figure 5B:
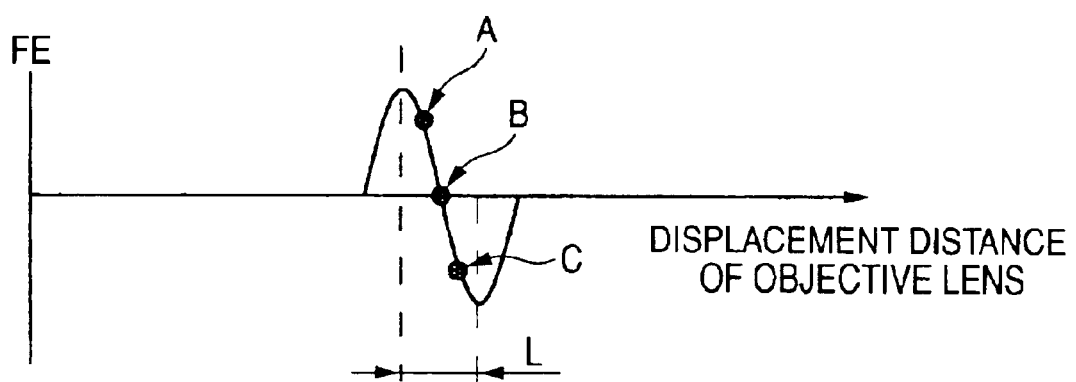

As well known in the art, when the objective lens is approached to the optical disc 10, the beam shape of the reflected light from the optical disc 10 detected by the photodetector 11 is changed in the sequence shown in FIG. 5A, and the focus error signal shown in FIG. 5B is measured. In FIG. 5B, the abscissa shows the displacement distance of the objective lens. When the focus error signal (S shape characteristic) is changed from the maximum value to the minimum value, the displacement distance of the objective lens is about $7\mu$.

During the process of measuring the focus error signal in s2, the optical disc apparatus 1 measures the position of the objective lens at the timing when the reproduced signal (RF) output from the adder 26 is at the maximum. The optical disc apparatus 1 sets the measured point where the reproduced signal is at the maximum, as a reference level of the focus error signal. The preamplifier 5 calculates a bias which is to be applied to the focus error signal output from the subtractor 25 so that the reference voltage coincides with a predetermined voltage, for example, 0 V (s3).

Figure 6A:
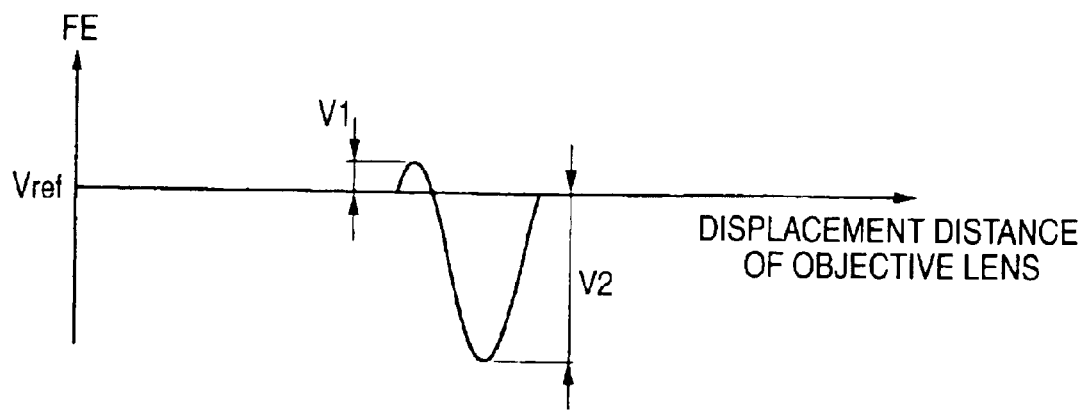
FIG. 6 is a view illustrating a focus error signal which is adjusted by a bias.
Figure 6B:
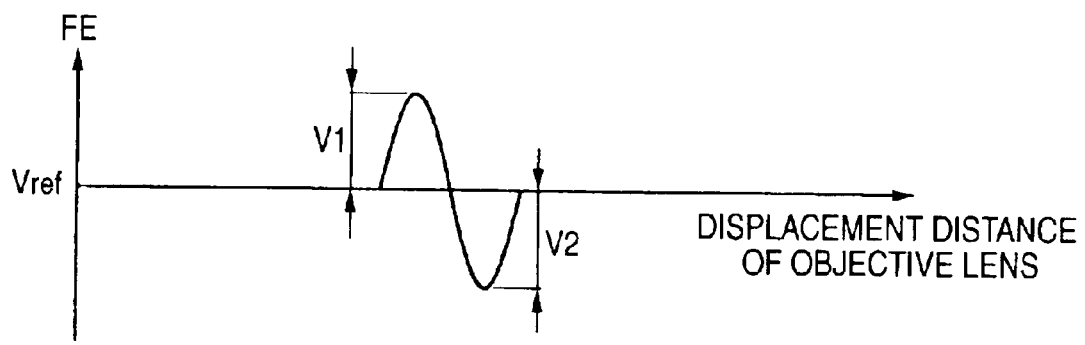
Figure 6C:
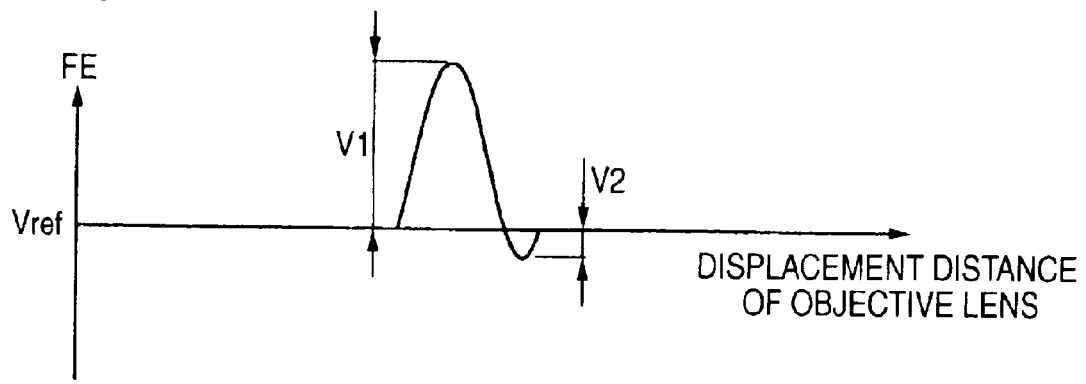

When the bias calculated in s3 is applied to the focus error signal output from the subtractor 25, the focus error signal in which, for example, the point A of FIG. 5B is set as the reference level shows the waveform shown in FIG. 6A, that in which the point B of FIG. 5B is set as the reference level shows the waveform shown in FIG. 6B, and that in which the point C of FIG. 5B is set as the reference level shows the waveform shown in FIG. 6C.

The optical disc apparatus 1 turns off the servo circuit 4 (s4), whereby the movement of the objective lens of the pickup head 2 is restricted.

Alternatively, the process of s4 may be performed in advance of s3.

The optical disc apparatus 1 calculates the gain G1 of the amplifier 23, and the gain G2 of the amplifier 24 (s6). The calculations of the gains G1 and G2 in s6 are performed in the following manner.

The optical disc apparatus 1 calculates the gain G1 of the amplifier 23 so that the potential difference between the maximum value of the focus error signal measured in s2, and the reference level becomes equal to a preset potential difference V, and calculates the gain G2 of the amplifier 24 so that the potential difference between the minimum value of the focus error signal measured in s2, and the reference level becomes equal to the preset potential difference V.

After the gains G1 and G2 of the amplifiers 23 and 24 are calculated in s6, the optical disc apparatus 1 applies the bias calculated in s3 to the focus error signal output from the subtractor 25, and sets the gains G1 and G2 of the amplifiers 23 and 24 to the value calculated in s6 (s7). Thereafter, the optical disc apparatus 1 turns on the servo circuit 4 which has been turned on in s4 (s8), to start the focus control (s9). After track-on is attained, the reproduction operation is started (s10).

When the focus control is started in s9, the optical disc apparatus 1 starts also the tracking control.

In the optical disc apparatus 1, after the process of s7 is completed, the balance of the focus error signal output from the subtractor 25 is adjusted, and the maximum and minimum values of the signal are substantially symmetrical about the reference level as in the waveform shown in FIG. 6B. In the reproduction operation in s10, therefore, the focus control is performed by using the balance-adjusted focus error signal. As a result, the focus control can be stably performed, so that an out-of-focus condition can be suppressed from occurring during the reproduction operation.

As described above, the optical disc apparatus of the embodiment is provided with the function of adjusting the balance of the focus error signal, and performs the focus control by using the focus error signal in which the balance is adjusted by the function, with the result that the focus control can be stably performed.

Since the gains G1 and G2 of the amplifiers 23 and 24 and the bias are adjusted under the state where the servo circuit 4 is turned off, a phenomenon that, during the gain adjusting process, the servo circuit 4 temporarily operates at an inadequate gain to cause the objective lens to be displaced does not occur. Therefore, the objective lens can be surely prevented from colliding with the optical disc 10 during the gain adjusting process (the process of adjusting the balance of the focus error signal), to be broken.

As described above, according to the invention, the function of adjusting the balance of the focus error signal is provided, and the focus control is performed by using the focus error signal in which the balance is adjusted by the function. Therefore, the focus control can be stably performed.

The balance of the focus error signal is adjusted under a focus off state in which the focus control is not performed. During a process of adjusting the gain, therefore, a phenomenon that the apparatus is temporarily operated at an inadequate gain to displace the objective lens does not occur. As a result, the objective lens can be surely prevented from colliding with the optical disc during the process of adjusting the balance of the focus error signal, to be broken.

[FIG. 1]
1 OPTICAL DISC APPARATUS
3 MOTOR
4 SERVO CIRCUIT
5 PREAMPLIFIER
6 BUFFER MEMORY
7 REPRODUCTION SECTION
8 CONTROL SECTION
A REPRODUCED SIGNAL
[FIG. 3]
A READ SIGNAL
[FIG. 4]
A BALANCE ADJUSTING PROCESS
s1 SET GAINS OF TWO AMPLIFIERS TO X
s2 MEASURE FE SIGNAL
s3 CALCULATE BIAS
s4 TURN OFF SERVO CIRCUIT
s5 DETECT BALANCE
s6 CALCULATE GAINS G1 AND G2 OF TWO AMPLIFIERS
s7 APPLY BIAS, SET GAINS G1 AND G2
s8 TURN ON SERVO CIRCUIT
s9 START FOCUS CONTROL
s10 START REPRODUCTION OPERATION
[FIG. 5B]
P DISPLACEMENT DISTANCE OF OBJECTIVE LENS
[FIG. 6A]
P DISPLACEMENT DISTANCE OF OBJECTIVE LENS
[FIG. 6B]
P DISPLACEMENT DISTANCE OF OBJECTIVE LENS
[FIG. 6C]
P DISPLACEMENT DISTANCE OF OBJECTIVE LENS

Figure 7A:
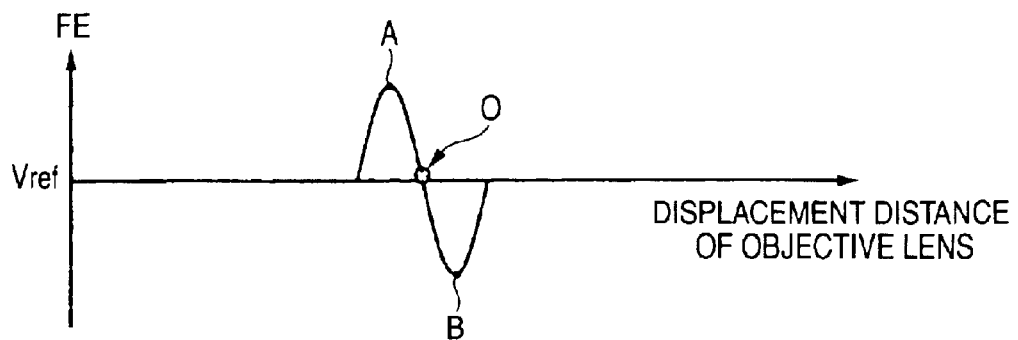
FIG. 7 is a view illustrating problems of a conventional optical disc apparatus.
Figure 7B:
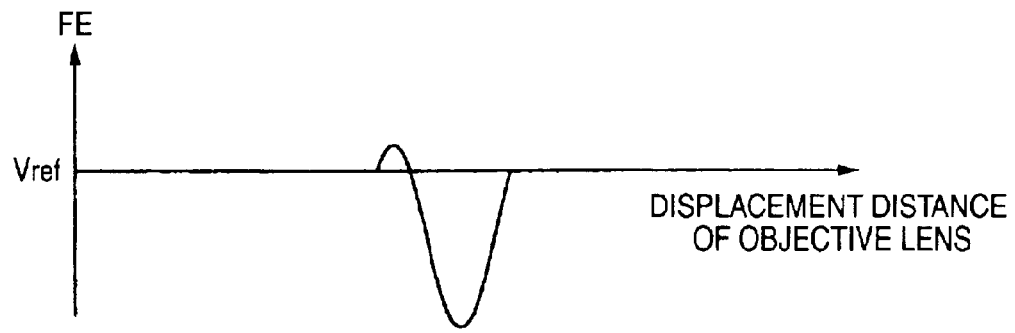
Figure 7C:
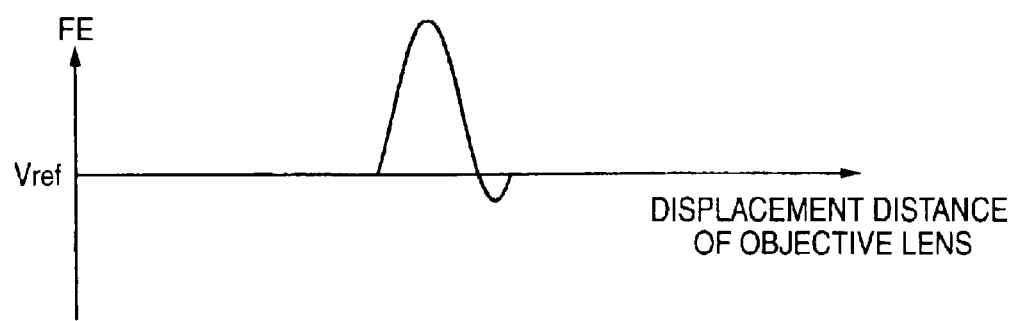
Figure 8:
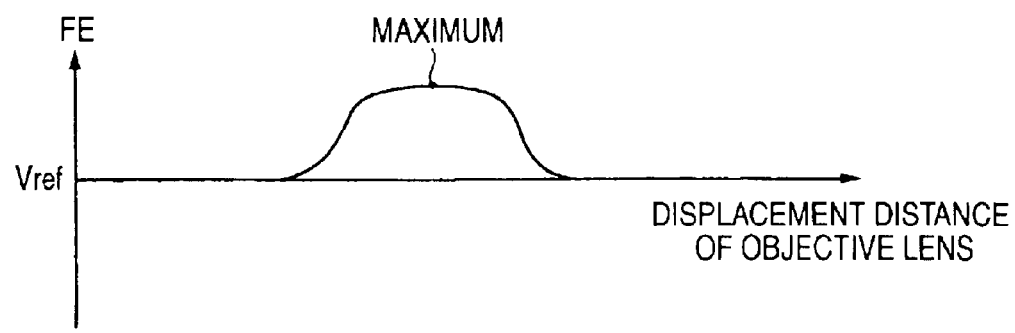
FIG. 8 is a view illustrating a displacement of amount of light reflected from a disc.

[FIG. 7A]
P DISPLACEMENT DISTANCE OF OBJECTIVE LENS
[FIG. 7B]
P DISPLACEMENT DISTANCE OF OBJECTIVE LENS
[FIG. 7C]
P DISPLACEMENT DISTANCE OF OBJECTIVE LENS
[FIG. 8]
P DISPLACEMENT DISTANCE OF OBJECTIVE LENS
A maximum

What is claimed is:

1. An optical disc apparatus comprising:
    a pickup head which has a four-split photodetector, two photodetector elements being arranged in each of vertical and lateral directions, and in which reflected light of an optical beam irradiating an optical disc that is set to a main unit is detected by said four-split photodetector, to read data recorded on said optical disc;
    a focus control section which controls an objective lens disposed in said pickup head to be moved, in an optical axis direction of the optical beam irradiating said optical disc, to maximize an amount of reflected light from said optical disc and detected by said four-split photodetector; and
    a reproduction section which outputs a reproduced signal based on the data that are read from said optical disc by said pickup head, wherein
    said focus control section controls said objective lens to be moved in said optical axis direction, and measures, as a focus error signal, a differential signal indicative of a difference between a sum of amounts of reflected light detected by two of upper right and lower left ones of said photodetector elements, and a sum of amounts of reflected light detected by two of upper left and lower right ones of said photodetector elements,
    a level of the measured focus error signal at a timing when the amount of reflected light from said optical disc and detected by said four-split photodetector is at a maximum is set as a reference level,
    under a focus off state in which the movement of said objective lens is restricted, a first gain for the sum of amounts of reflected light detected by said two of upper right and lower left photodetector elements, and a second gain for the sum of amounts of reflected light detected by said two of upper left and lower right photodetector elements are adjusted, so that a balance of the focus error signal is adjusted to cause maximum and minimum values of the focus error signal with respect to the reference level to be substantially symmetrical about the reference level, and
    the movement of said objective lens is controlled by using the balance-adjusted focus error signal.

2. An optical disc apparatus comprising:
    a pickup head which has a four-split photodetector, two photodetector elements being arranged in each of vertical and lateral directions, and in which reflected light of an optical beam irradiating an optical disc that is set to a main unit is detected by said four-split photodetector, to read data recorded on said optical disc;
    a focus control section which controls an objective lens disposed in said pickup head to be moved, in an optical axis direction of the optical beam irradiating said optical disc, to maximize an amount of reflected light from said optical disc and detected by said four-split photodetector; and
    a reproduction section which outputs a reproduced signal based on the data that are read from said optical disc by said pickup head, wherein
    said focus control section controls said objective lens to be moved in the optical axis direction, and measures, as a focus error signal, a differential signal indicative of a difference between a sum of amounts of reflected light detected by two of upper right and lower left ones of said photodetector elements, and a sum of amounts of reflected light detected by two of upper left and lower right ones of said photodetector elements,
    a level of the measured focus error signal at a timing when the amount of reflected light from said optical disc and detected by said four-split photodetector is at a maximum is set as a reference level,
    a first gain for the sum of amounts of reflected light detected by said two of upper right and lower left photodetector elements, and a second gain for the sum of amounts of reflected light detected by said two of upper left and lower right photodetector elements are adjusted, so that a balance of the focus error signal is adjusted to cause maximum and minimum values of the focus error signal with respect to the reference level to be substantially symmetrical about the reference level, and
    the movement of said objective lens is controlled by using the balance-adjusted focus error signal.

3. The optical disc apparatus according to claim 2, wherein,
    in the balance adjustment, the first and second gains are adjusted to cause the reference level to be substantially in a center between the maximum and minimum values of the focus error signal.

4. The optical disc apparatus according to claim 2, wherein
    the first and second gains are adjusted under a focus off state in which the movement of the objective lens is restricted.

5. A focus control of an optical disc apparatus comprising the steps of:
    moving an objective lens in an optical axis direction to measure, as a focus error signal, a differential signal indicative of a difference between a sum of amounts of reflected light detected by two of upper right and lower left ones of four-split photodetector elements, and a sum of amounts of reflected light detected by two of upper left and lower right ones of said photodetector elements,
    setting a level of the measured focus error signal at a timing when the amount of reflected light from an optical disc and detected by said photodetector is at a maximum as a reference level,
    under a focus off state in which the movement of said objective lens is restricted, adjusting a first gain for the sum of amounts of reflected light detected by said two of upper right and lower left photodetector elements, and a second gain for the sum of amounts of reflected light detected by said two of upper left and lower right photodetector elements,
    adjusting a balance of the focus error signal to cause maximum and minimum values of the focus error signal with respect to the reference level to be substantially symmetrical about the reference level, and
    controlling the movement of said objective lens by using the balance-adjusted focus error signal.

6. A control method of an optical disc apparatus comprising the steps of:

moving an objective lens in an optical axis direction to measure, as a focus error signal, a differential signal indicative of a difference between a sum of amounts of reflected light detected by two of upper right and lower left ones of four-split photodetector elements, and a sum of amounts of reflected light detected by two of upper left and lower right ones of said photodetector elements, setting a level of the measured focus error signal at a timing when the amount of reflected light from an optical disc and detected by said photodetector is at a maximum as a reference level, adjusting a first gain for the sum of amounts of reflected light detected by said two of upper right and lower left photodetector elements, and a second gain for the sum of amounts of reflected light detected by said two of upper left and lower right photodetector elements, adjusting a balance of the focus error signal to cause maximum and minimum values of the focus error signal with respect to the reference level to be substantially symmetrical about the reference level, and controlling the movement of said objective lens by using the balance-adjusted focus error signal.

7. The optical disc apparatus according to claim 6, wherein, in the balance adjustment, adjusting the first and second gains to cause the reference level to be substantially in a center between the maximum and minimum values of the focus error signal.

8. The optical disc apparatus according to claim 6, wherein adjusting the first and second gains under a focus off state in which the movement of the objective lens is restricted.

* * * * *